US010007681B2

United States Patent
Hill et al.

(10) Patent No.: US 10,007,681 B2
(45) Date of Patent: Jun. 26, 2018

(54) ADAPTIVE SAMPLING VIA ADAPTIVE OPTIMAL EXPERIMENTAL DESIGNS TO EXTRACT MAXIMUM INFORMATION FROM LARGE DATA REPOSITORIES

(71) Applicant: Tibco Software Inc., Palo Alto, CA (US)

(72) Inventors: Thomas Hill, Tulsa, OK (US); Pawel Lewicki, Tulsa, OK (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 458 days.

(21) Appl. No.: 14/666,918

(22) Filed: Mar. 24, 2015

(65) Prior Publication Data

US 2016/0283524 A1  Sep. 29, 2016

(51) Int. Cl.
*G06F 17/30* (2006.01)

(52) U.S. Cl.
CPC .. *G06F 17/30292* (2013.01); *G06F 17/30306* (2013.01)

(58) Field of Classification Search
CPC .......... G06F 17/5063; G06F 17/30292; G06F 17/30306
See application file for complete search history.

(56) References Cited

U.S. PATENT DOCUMENTS

| | | | | | |
|---|---|---|---|---|---|
| 2003/0044821 | A1* | 3/2003 | Bader | ................. | C12Q 1/6883 435/6.11 |
| 2008/0201117 | A1* | 8/2008 | Wong | ................. | G06F 17/5009 703/2 |
| 2009/0228846 | A1* | 9/2009 | McConaghy | ....... | G06F 17/5063 716/106 |
| 2010/0100419 | A1* | 4/2010 | Natoli | ................ | G06Q 30/0202 705/7.31 |
| 2012/0330618 | A1* | 12/2012 | Austin | ................ | G06K 9/00785 702/189 |
| 2013/0282626 | A1* | 10/2013 | White | ................ | G06Q 30/0201 706/11 |
| 2014/0172871 | A1* | 6/2014 | Brayman | ............ | G06F 11/3664 707/741 |

OTHER PUBLICATIONS

"Fully Bayesian Experimental Design for Pharmacokinetic Studies", Ryan et al, Feb. 27, 2015.*
List of Patents or Applications Treated as Related, dated Jun. 21, 2016.

* cited by examiner

*Primary Examiner* — Tarek Chbouki
(74) *Attorney, Agent, or Firm* — McGuireWoods LLP

(57) ABSTRACT

A system, method, and computer-readable medium for extracting the samples from big data to extract most information about the relationships of interest between dimensions and variables in the data repository. More specifically, extracting information from large data repositories follows an adaptive process that uses systematic sampling procedures derived from optimal experimental designs to target from a large data set specific observations with information value of interest for the analytic task under consideration. The application of adaptive optimal design to guide exploration of large data repositories provides advantages over known big data technologies.

19 Claims, 3 Drawing Sheets

US 10,007,681 B2

ADAPTIVE SAMPLING VIA ADAPTIVE OPTIMAL EXPERIMENTAL DESIGNS TO EXTRACT MAXIMUM INFORMATION FROM LARGE DATA REPOSITORIES

BACKGROUND OF THE INVENTION

Field of the Invention

The present invention relates to information handling systems. More specifically, embodiments of the invention relate to extraction of information for large data repositories.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to collect and store large amounts of data. However, a mismatch exists with respect to technologies to collect and store data, vs. available technologies and capabilities to extract useful information from large data within a reasonable amount of time. It is known to deploy technologies such as Hadoop and HDFS for large and unstructured data storage across various industries. Many technologies are being developed to process large data sets (often referred to as "big data", and defined as an amount of data that is larger than what can be copied in its entirety from the storage location to another computing device for processing within time limits acceptable for timely operation of an application using the data), however, the ability to collect and store data often outpaces the ability to process all of the data.

Most known Big Data technologies focus on how to process and analyze all data within a large data repository. This approach is bound to become inefficient or might even fail for practical applications because data volumes can and usually will grow at a very fast rate while the information contained in the data will not.

SUMMARY OF THE INVENTION

A system, method, and computer-readable medium are disclosed for extracting the samples from big data to extract most information about the relationships of interest between dimensions and variables in the data repository. More specifically, extracting information from large data repositories follows an adaptive process that uses systematic sampling procedures derived from optimal experimental designs to target from a large data set specific observations with information value of interest for the analytic task under consideration. The application of adaptive optimal design to guide exploration of large data repositories provides advantages over known big data technologies.

For example, an example process generates values for 1000 parameters (x1, ..., x1000) every second. Further, the values for 10 of these parameters interact in a complex fashion to affect some important outcome value y of interest, so that y is a function of 10 unknown parameters xi through xq, or y=f(xi, xj, xk, ..., xq). In this example, the information available in the 1000 input parameters for predicting y is finite, and regardless of how much data is collected for x and y, this information will not change. Therefore, by applying a strategy to query the very large dataset for the specific observations that are most diagnostic with respect to estimation procedures for approximating from the data the function y=f(xi, xj, xk, ..., xq) significant effort and time can saved.

Accordingly applying adaptive sampling operations allow adaptive optimal experimental design operations devised for manufacturing to be used to implement an efficient information gathering strategy against very large data repositories.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
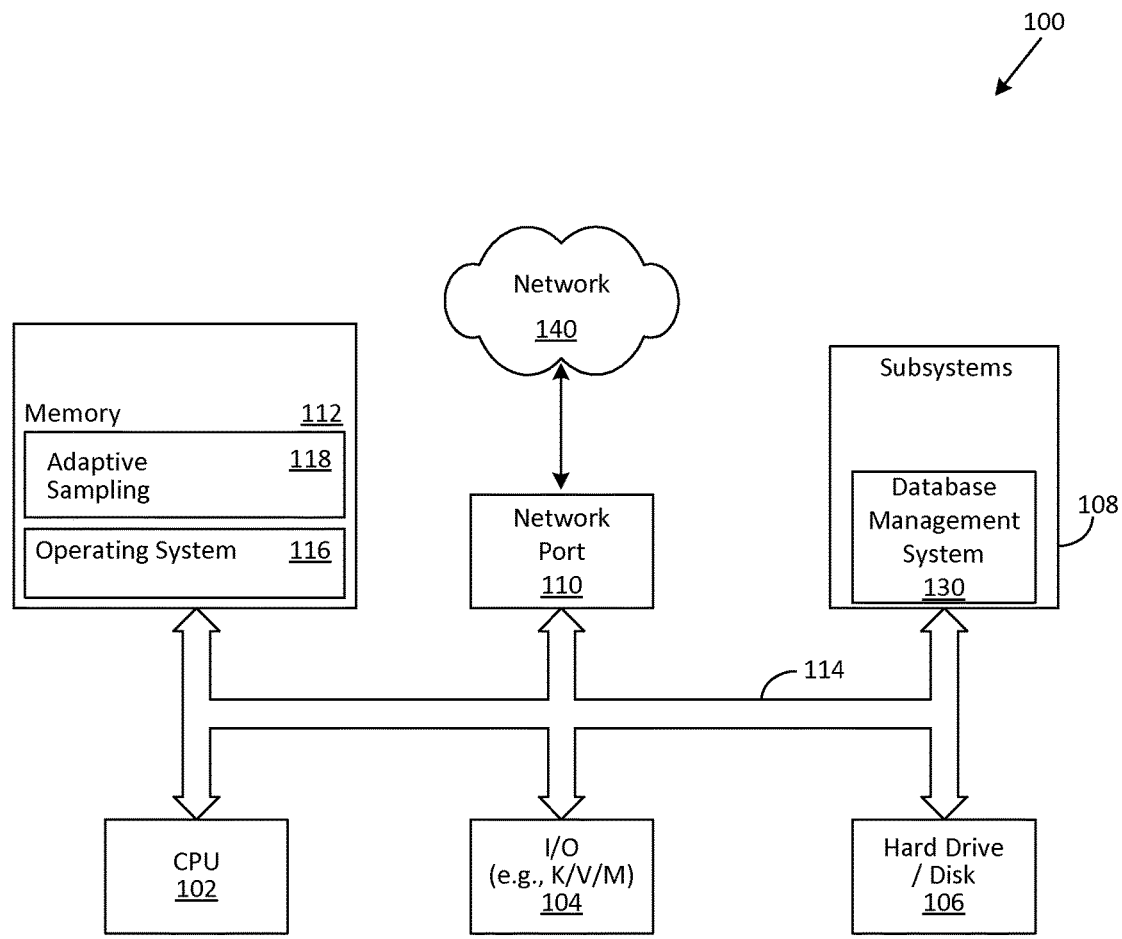
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an adaptive sampling module 118. Also, in certain embodiments, the information handling system 100 further includes a database management system 130 for accessing and interacting with various data repositories such as big data repositories.

Figure 2:
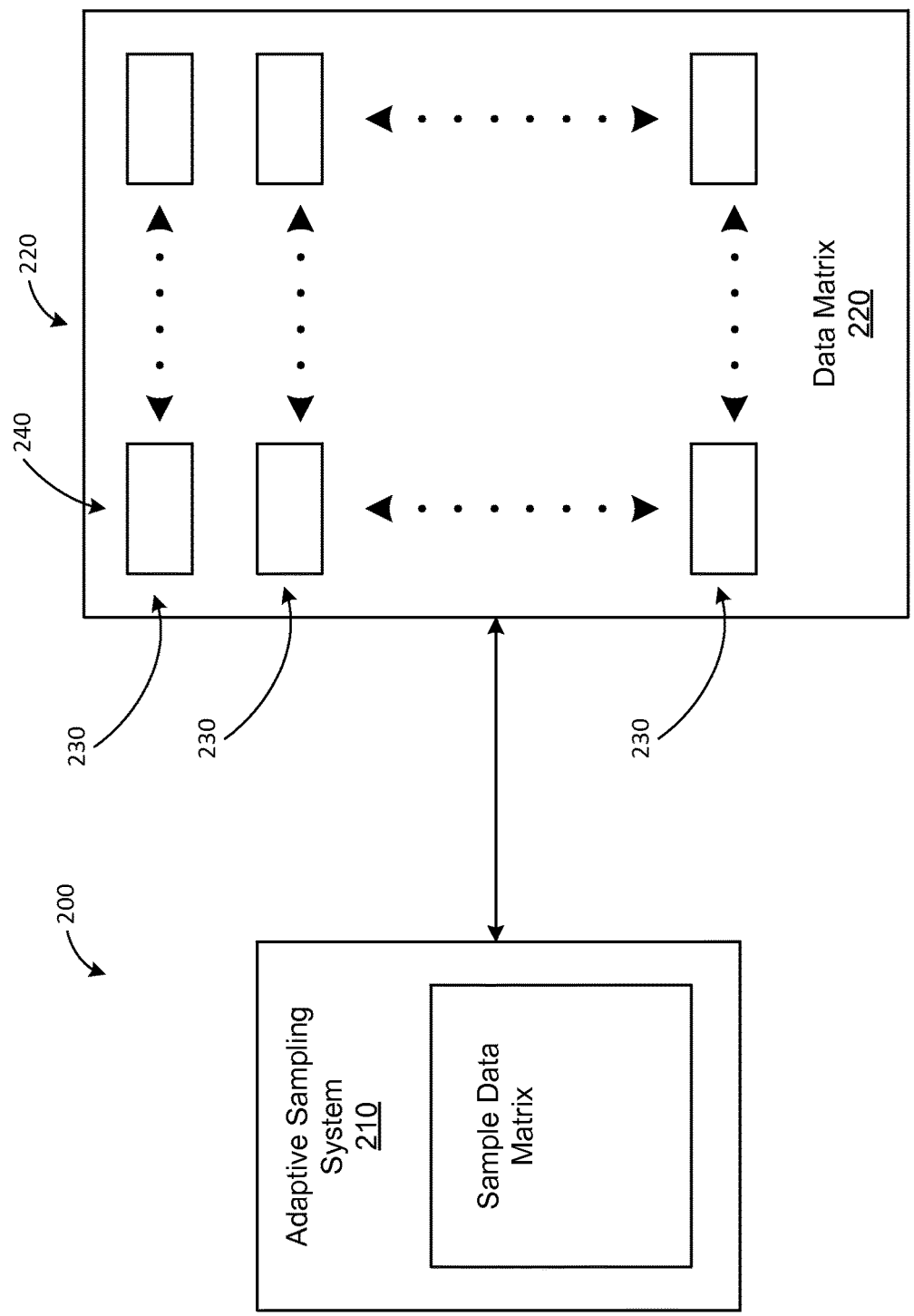
FIG. 2 shows a block diagram of an adaptive sampling environment.

Referring to FIG. 2 a block diagram of an adaptive sampling environment 200 is shown. More specifically, the adaptive sampling environment 200 includes an adaptive sampling system 210 which interacts with a data matrix 220. The data matrix 220 includes n rows 230 by m columns 240 of values of explanatory variables. The rows 230 represent cases of the data matrix and the columns 240 represent variables of the data. The adaptive sampling system 210 extracts from that data matrix as much information as possible for the prediction of some variable y, or for other analytic tasks.

The adaptive sampling system 210 determines an arrangement of specific observations chosen into a sample data matrix X'. The accuracy of any linear model (which may be considered the information) for the adaptive sampling system 210 predicting y depends on the specific observations chosen into the sample data matrix X' (which may be referred to as Design Matrix X'). By using optimal experimental design to select a best sample Design Matrix X' from a much larger data matrix X, the computational effort involved in extracting information from the data matrix X is independent of the size of X (i.e., the size of the actual big data) and is only dependent of the complexity of the specific prediction models to be considered.

Figure 3:
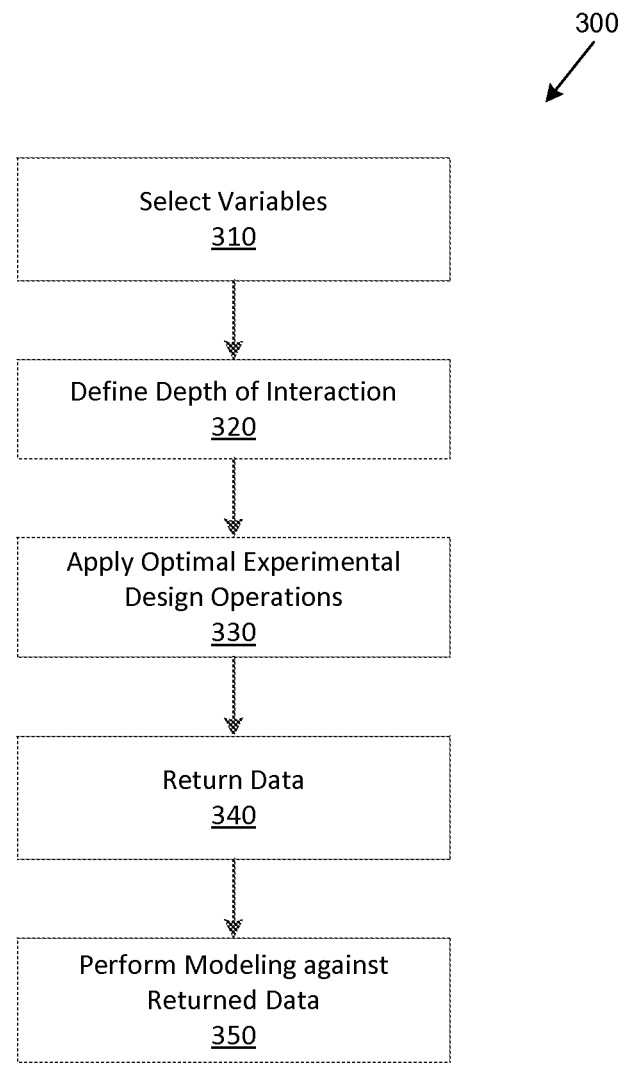
FIG. 3 shows a flow chart of the operation of an adaptive sampling system.

Referring to FIG. 3, a flow chart of the operation 300 of an adaptive sampling system 210 is shown. In certain embodiments, the adaptive sampling system 210 includes some or all of the adaptive sampling module 118.

The operation of the adaptive sampling system starts at step 310 by the adaptive sampling system 210 selecting variables X from a big-data-repository. Next, at step 320, the adaptive sampling system 210 defines the depth of interactions that are of interest. Next at step 330, the adaptive sampling system 210 applies optimal experimental design operations to the selected variables and the defined depth of interactions. Return data to adaptive sampling system 210 based upon optimal experimental design operations at step 340. Next, at step 350, once data are returned to the adaptive sampling system, subsequent modeling is performed against the much smaller sample matrix X'.

When defining the depth of interactions that are of interest, the adaptive sampling system 210 considers a plurality of issues. More specifically, the adaptive sampling system determines whether to only consider the information that can be extracted using each parameter. Additionally, the adaptive sampling system 210 determines whether to consider certain interactions such as interactions of the type $X1*X2$, $X2*X3, \ldots, Xi*Xj$. The example interaction type shows two-way interactions or the multiplications of two design "vectors." However, the adaptive sampling system 210 can also define three- or higher-way interactions as well.

Additionally, the adaptive sampling system 210 determines the types of variable to consider. The variables may be continuous variables, rank-ordered variables or discrete variables. An example of a continuous variable is age, an example of rank-ordered variable is a grade received in a class and an example of a discrete variable is gender. When defining a depth of interaction for continuous variables and rank-ordered variables, the adaptive sampling system 210 identifies high (or maximum) and low (or minimum) category values and then divides a range of values into predefined categories (e.g., high and low, high, medium and low, etc.). Other methods for dividing a range of values such as continuous values are also contemplated, for example by dividing the range of continuous values into intervals of equal width, or intervals with equal numbers of rows, or by applying optimal binning operations to determine the division of the range which would yield the greatest separation of y values across the bins.

When defining a depth of interaction for discrete variables, the adaptive sampling system 210 identifies a number of distinct or discrete values. Often, the information needed to define the depth of interaction is available a-priori and it is not necessary to consult the values in the data matrix X (i.e., it is not necessary to read the big data).

Next, when defining a depth of interaction, the adaptive sampling system may identify known constraints on the relationships between the variables in X. In certain embodiments, the constraints can be of the form $A1*x1+A2*x2+ \ldots +Aq*xq+A0>=0$. Defining of these constraints can be important when dealing with "mixtures" in industrial settings (e.g., where the ingredients must sum to 100%) but also elsewhere (e.g., when interested in information about families with five children; the number of boys and girls in each family must be equal to five).

When performing step 330, after variables are selected and the depth of interaction of the variables is defined, (what variables to consider, how complex in terms of interactions should the information be that is to be considered and extracted, and basic information about the numbers of "buckets" or "bins" for each variable), the adaptive sampling system 210 applies optimal experimental design methods. More specifically, the optimal experimental design methods can comprise any operation which constructs a collection of observations which extract the maximum amount of information from the experimental region; these are sometimes referred to as "optimal designs," "D-Optimal design," or "A-optimal design," or else depending on the specific optimization statistic that is chosen by the operator. The optimal experimental design selects the specific observations from all possible or available observations in the raw data, so that given a specific statistical model, the predictions from the model are expected to be of the highest possible accuracy as defined by different statistical criteria based on the expected variance. Specifying an appropriate statistical model and specifying a suitable criterion function both take into account statistical theory and practical knowledge with designing experiments. After the optimal design matrix has been determined, the adaptive sampling system 210 randomly select cases from the big data repository to load into the design matrix, thus creating the sample X'.

In many databases and nonSQL datastores, the process of selecting cases from the big data repository can be performed efficiently by designing appropriate queries to sample specific cases from specific "strata" or "groups. In the present application the sample specific cases are defined through the rows of the optimal design matrix (e.g., select a "male" between the ages (15-17) and "caucasian" . . . ).

Once data are returned to the adaptive sampling system 210, subsequent modeling can then commence against the much smaller sample matrix X' which contains the maximum amount of information extracted from X with the fewest number of cases.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for identifying information within a data repository, comprising:
    selecting variables of interest within the data repository to provide selected variables;
        defining a depth of interactions of interest with respect to the variables of interest to provide a defined depth of interactions;
    applying an optimal experimental design operation to the selected variables and the defined depth of interactions, the applying comprising determining a design matrix based upon the optimal experimental design operation;
    selecting, using at least one query, a sample case from the data repository, the at least one query being based on the design matrix, wherein a computational effort associated with selecting the sample case from the data repository is independent of a size of data in the data repository, and is dependent on a prediction model associated with selecting the sample case;
    loading the sample case into the design matrix, resulting in a sample matrix of the data repository; and
    performing modeling operations based on the sample matrix of the data repository.

2. The method of claim 1, wherein:
    defining the depth of interactions that are of interest further comprises determining whether to consider information that can be extracted using each variable of interest.

3. The method of claim 1, wherein:
    defining the depth of interactions that are of interest further comprises determining whether to consider certain interactions of the variables of interest.

4. The method of claim 3, wherein:
the certain interactions comprise two-way interactions between two design vectors based upon the variables of interest.

5. The method of claim 1, wherein:
defining the depth of interactions that are of interest further comprises determining types of variables to consider, the types of variables being identified as continuous variables, rank-ordered variables and discrete variables.

6. The method of claim 1, wherein:
defining the depth of interactions that are of interest further comprises identifying known constraints on relationships between the variables of interest.

7. The system of claim 1, wherein:
defining the depth of interactions that are of interest further comprises identifying known constraints on relationships between the variables of interest.

8. The method of claim 1, wherein the design matrix comprises an optimal design matrix, and wherein the sample case is defined through rows of the design matrix.

9. The method of claim 1, wherein defining the depth of interactions of interest comprises identifying a range of values associated with the variables of interest and dividing the range of values into categories of interest.

10. The method of claim 1, wherein defining the depth of interactions of interest comprises identifying a range of values associated with the variables of interest and dividing the range of values based on applying an optimal binning operation to the range of values.

11. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for: selecting variables of interest within the data repository to provide selected variables;
defining a depth of interactions of interest with respect to the variables of interest to provide a defined depth of interactions;
applying an optimal experimental design operation to the selected variables and the defined depth of interactions, the applying comprising determining a design matrix based upon the optimal experimental design operation;
selecting, using at least one query, a sample case from the data repository, the at least one query being based on the design matrix, wherein a computational effort associated with selecting the sample case from the data repository is independent of a size of data in the data repository, and is dependent on a prediction model associated with selecting the sample case;
loading the sample case into the design matrix, resulting in a sample matrix of the data repository; and
performing modeling operations based on the sample matrix of the data repository.

12. The system of claim 11, wherein:
defining the depth of interactions that are of interest further comprises determining whether to consider information that can be extracted using each variable of interest.

13. The system of claim 11, wherein:
defining the depth of interactions that are of interest further comprises determining whether to consider certain interactions of the variables of interest.

14. The system of claim 13, wherein:
the certain interactions comprise two-way interactions between two design vectors based upon the variables of interest.

15. The system of claim 11, wherein:
defining the depth of interactions that are of interest further comprises determining types of variables to consider, the types of variables being identified as at least one of continuous variables, rank-ordered variables and discrete variables.

16. A non-transitory, computer-readable storage medium embodying computer program code, the computer program code comprising computer executable instructions configured for:
selecting variables of interest within the data repository to provide selected variables;
defining a depth of interactions of interest with respect to the variables of interest to provide a defined depth of interactions;
applying an optimal experimental design operation to the selected variables and the defined depth of interactions, the applying comprising determining a design matrix based upon the optimal experimental design operation;
selecting, using at least one query, a sample case from the data repository, the at least one query being based on the design matrix, wherein a computational effort associated with selecting the sample case from the data repository is independent of a size of data in the data repository, and is dependent on a selection model associated with selecting the sample case;
loading the sample case into the design matrix, resulting in a sample matrix of the data repository; and
performing modeling operations based on the sample matrix of the data repository.

17. The non-transitory, computer-readable storage medium of claim 16, wherein:
defining the depth of interactions that are of interest further comprises determining whether to consider information that can be extracted using each variable of interest or consider certain interactions of the variables of interest.

18. The non-transitory, computer-readable storage medium of claim 16, wherein:
defining the depth of interactions that are of interest further comprises determining types of variables to consider, the types of variables being identified as at least one of continuous variables, rank-ordered variables and discrete variables.

19. The non-transitory, computer-readable storage medium of claim 16, wherein:
defining the depth of interactions that are of interest further comprises identifying known constraints on relationships between the variables of interest.

* * * * *